Dec. 22, 1959  W. W. HAY  2,918,356
TRANSPARENT, CONDUCTIVE ABSORBER CANISTER
Filed Nov. 4, 1957  2 Sheets-Sheet 1

INVENTOR.
WAYNE W. HAY
BY
ATTORNEY & AGENT

Dec. 22, 1959 W. W. HAY 2,918,356
TRANSPARENT, CONDUCTIVE ABSORBER CANISTER
Filed Nov. 4, 1957 2 Sheets-Sheet 2
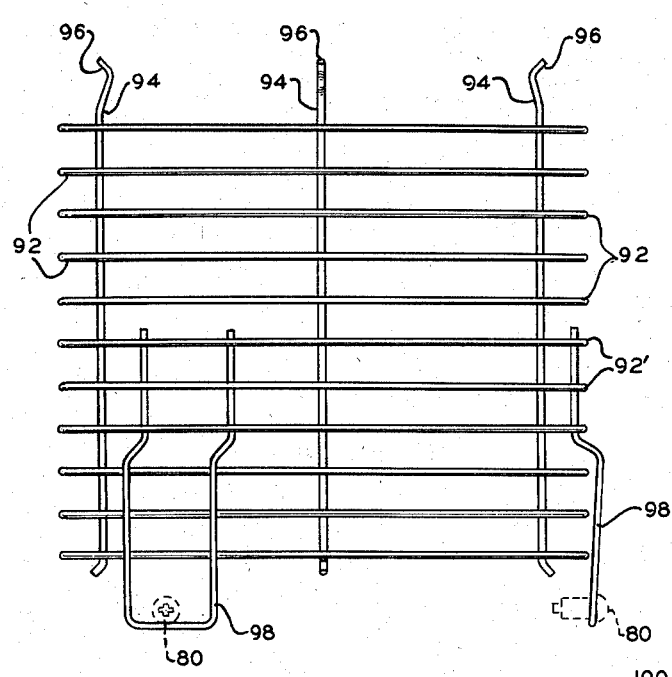
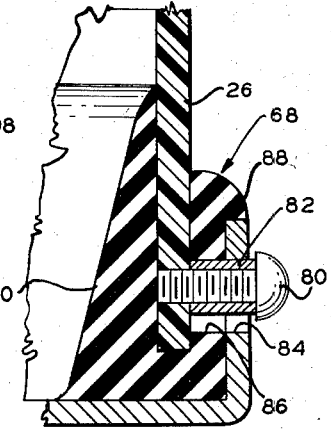
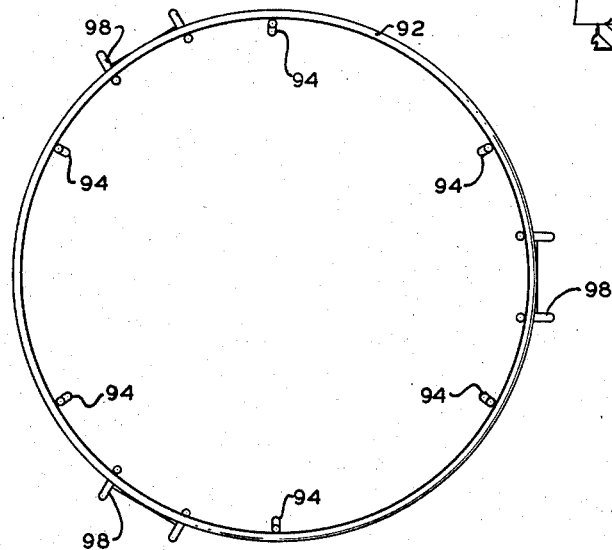
INVENTOR.
WAYNE W. HAY
BY
ATTORNEY & AGENT

United States Patent Office 2,918,356
Patented Dec. 22, 1959

2,918,356
TRANSPARENT, CONDUCTIVE ABSORBER CANISTER

Wayne W. Hay, Madison, Wis., assignor to Air Reduction Company, Incorporated, New York, N.Y., a corporation of New York Application November 4, 1957, Serial No. 694,405

9 Claims. (Cl. 23—284)

This invention relates to apparatus for absorbing carbon dioxide from respiratory gases containing an anesthetic vapor, which are administered to patients undergoing anesthesia.

This type of apparatus is frequently referred to as an anesthetic absorber and in its conventional form includes a suitable canister or container which holds a supply of an absorbent material, such as soda lime, which is effective in the presence of the respiratory gases circulated therethrough to remove the carbon dioxide. In a popular form of absorbent now increasingly in use, the soda lime is provided with an indicator agent which, in the course of absorption and subsequent depletion of the absorptive capacity of the charge gradually changes color, for example, one such soda lime absorbent contains ethyl violet which changes color from white to purple as the soda lime's powers of absorption are exhausted. Thus the absorbent charge of this type, upon removal of the canister and inspection, permits a ready determination as to the general condition and remaining absorptive capacity. In this way, the need for replacement of the charge can be easily determined.

While the use of a color indicator in the soda lime facilitates a determination as to its absorptive capacity, it will be seen that it has been necessary to at least partially dismantle the anesthetic apparatus in which it is attached which, under some circumstances, is most convenient. There is, therefore, a strong felt need for suitable means for permitting an inspection of the absorbent material without requiring any detachment or removal of any part of the anesthetic apparatus. Accordingly, it is an object of the present invention to provide a compact and easily mountable canister for holding a charge of carbon dioxide absorbent material having substantially transparent side walls permitting direct observation of the charge material without removal of the canister.

A further object of the invention is to provide a detachable canister having an open top and a separable downtube unit therein such as shown and described in my copending application Serial No. 617,875, issued as United States Patent No. 2,848,309, wherein said canister is provided with substantially transparent side walls for direct observation of the absorbent charge therein.

Unfortunately, transparent materials such as Plexiglas and the like, which lend themselves to the construction of such a canister, are of dielectric nature as a result of which electrostatic charges may easily be accumulated thereon, merely in the process of normal handling. Such electrostatic charges, of course, are well recognized hazards in an operating room and particularly when created in the immediate vicinity of explosive anesthetic gas mixtures which, it has been found, may be detonated as a result of a discharge of energy accumulated in this manner. Accordingly, it is a further object of the present invention to provide such a canister having substantially transparent wall portions of a dielectric material wherein such wall portions are effectively shielded against the production of electrostatic charges thereon and which are furthermore electrically grounded to effectively, continuously dissipate electrostatic charges which may occur.

It has been found, further, in the provision of a canister having such desirable features, including a portion made of a suitably transparent material, that such material is considerably more susceptible to breakage or chipping along its edge portions than a conventional canister of metallic construction. Thus, a canister of this type may create a problem or inconvenience due to the necessity of more frequent replacement of these parts. It is, therefore, a still further object of the present invention to furnish such an improved canister, having an assembly of effectively sealed, separable parts in which the dismantling and replacement of the transparent portions may be quickly and easily achieved.

It is a still further object of the invention to provide such a canister wherein the separable members thereof are effectively interconnected so as to facilitate the handling thereof without the inadvertent separation of such parts such as to possibly result in the droppage and/or breakage of such transparent portions.

Still another object of the invention is to provide a unique interconnection between a cylindrical transparent member forming the wall of such a canister and a metallic end closure forming a bottom thereof having a prestressed gasket element interposed therebetween and interconnected by easily removable retaining means.

A still further object of the invention is to provide a substantially concentric metal screen surrounding a canister shell of transparent, nonconductive material forming a shield for such a canister wherein longitudinally extending resilient portions of said screen frictionally engage portions of said metallic bottom closure and in which a positive interconnection is made with the canister.

Other objects and advantages of the present invention will be better understood by reference to the following description of a preferred embodiment thereof and the accompanying drawings in which:

Fig. 4 is an enlarged sectional view illustrating in greater detail the gasket connection between the cylindrical transparent wall portion of the canister and the bottom plate closure therefor;

Fig. 6 is a vertical side view showing the protective screen employed in connection with the canister and illustrating its interconnection therewith; and Fig. 7 is a top view of the screen shown in Fig. 6.

Figure 1:
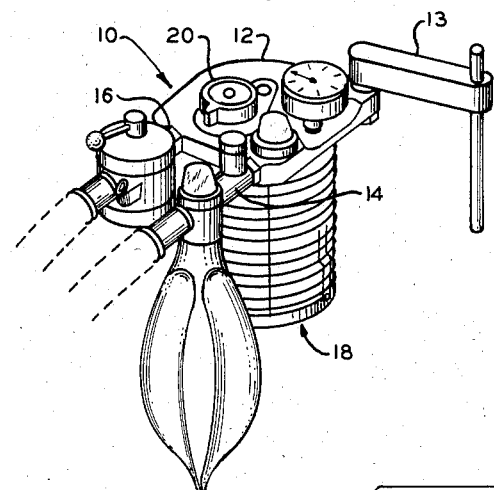
Fig. 1 is a perspective view of a portion of an anesthetic circuit showing a casing through which anesthetic gases are circulated, and a carbon dioxide canister constructed in accordance with the present invention which is mounted thereon so as to permit the circulation therethrough of the anesthetic circuit gases.
Figure 2:
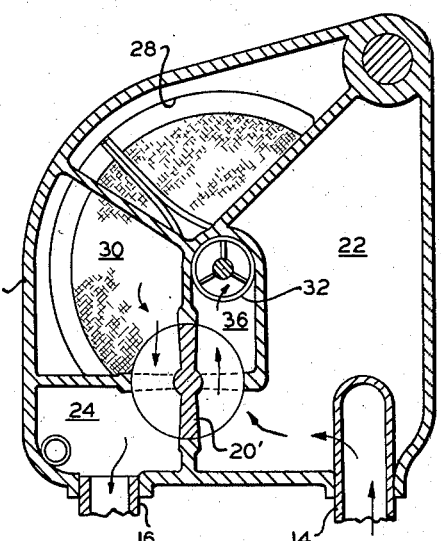
Fig. 2 is a horizontal sectional view through the absorber housing seen in Fig. 1 illustrating the path of the anesthetic gases therethrough and illustrating the conduction to and from the absorber canister.

Referring now to the drawings, an anesthetic absorber apparatus embodying a canister constructed in accordance with this invention is illustrated generally at 10 in Fig. 1. The absorber 10 and the general form of construction of the canister mounted thereon are generally similar to and provide an improvement for the absorber shown and described in my above-mentioned copending application, now issued as United States Patent No. 2,848,309 of which the present application is a continuation-in-part. Thus, the absorber includes a main housing 12, supported on a conventional anesthetic machine by a bracket 13 and having an inlet 14 and outlet 16. An anesthetic mixture formed in a breathing circuit, such as any conventional anesthetic circuit for which an absorber may be used as, for example, the circuit shown in my copending application Serial No. 617,875, is circulated therethrough. The canister 18 is mounted at the bottom of the housing and suitably arranged with respect thereto to permit such anesthetic gases to be circulated through the charge of absorbent material contained therein as will be more fully described hereinafter. A valve 20 is arranged at the top of the housing to permit the gases circulated through the housing to be directed through the canister or to be diverted and by-passed therefrom. Referring to Fig. 2, the circulation of the gases through the absorber housing may be more readily seen. Thus, the inlet 14, equipped with a conventional check valve to limit the gas flow to one direction, empties into a chamber 22 and the outlet 16 similarly communicates with a separate chamber 24 which is divided from the inlet chamber. As may be seen in this figure, as well as in Fig. 3, the canister 18 includes an outer cylindrical shell 26, the upper, open end of which registers with an opening 28 in the bottom of the absorber housing which communicates with a chamber 30 therein. A down tube 32 carried in the absorber canister registers with an opening 34 in the housing which, in turn, connects with a chamber 36 therein. Referring to Fig. 2, the inlet chamber 22 connects with the chamber 36 through the adjustable closure element 20′ of the gas control valve 20. Similarly the chamber 30 connects at the same time with the discharge chamber 24. Thus, when the valve is so arranged, gases delivered to the absorber are circulated through the respective passages as indicated by the arrows in Fig. 2, causing its passage downwardly through the down tube 32 of the canister and upwardly through the outer chamber formed within the shell 26 and thence to the absorber outlet. It will be seen that by rotating the valve element 20′ to the position shown in the dotted lines that the chamber 22 is directly interconnected with the chamber 24 and that in this event the canister is isolated from the breathing circuit and the gases passed directly from the inlet 14 to the outlet 16. In any intermediate position, of course, the relative proportions of the gases by-passing the canister may be varied.

Figure 3:
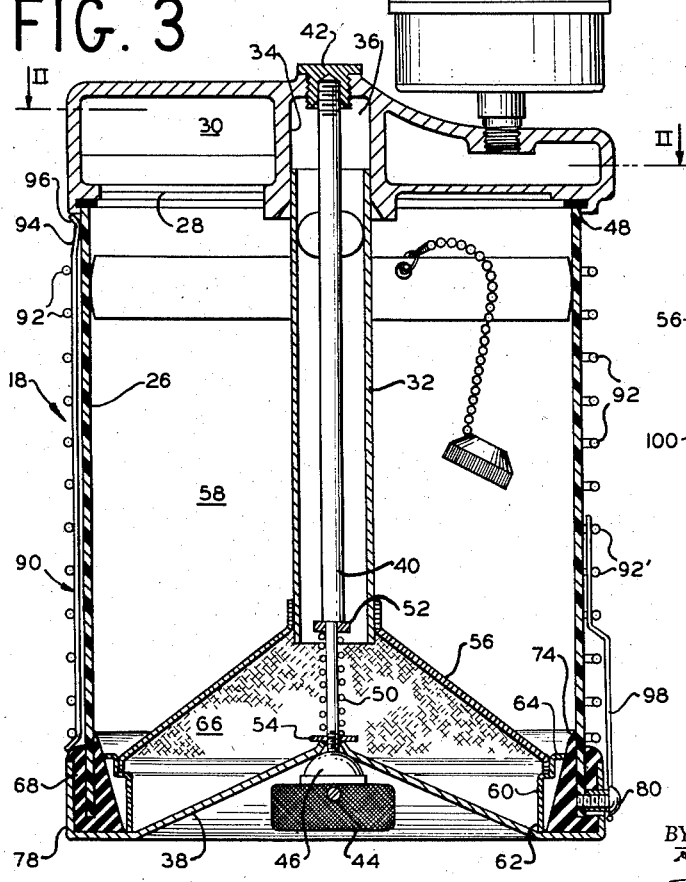
Fig. 3 is a vertical sectional view showing the absorber canister in mounted relation to the absorber housing.

Referring now to Fig. 3, the construction and arrangement of the canister 18 may be more fully understood. Referring thereto, it will be seen that the cylindrical shell 26 carries at its lower end an inverted conical plate 38. A retaining rod 40 extends upwardly through the down tube 32 and is received by its upper threaded end in a threaded bushing member 42 in the absorber housing. The opposite end of the retaining screw extends through the bottom closure 38 and receives thereon an adjusting knob 44 having a spherical bearing surface 46 which is adapted to bear upwardly against the bottom plate, thus effectively securing the canister and pressing its upper edge against a seating gasket 48 when the retaining rod is threaded into the bushing 42. The gasket 48 is situated in a recess in the bottom of the housing which, it will be seen, encloses the bottom opening 28 therein. A spring 50 is disposed on the retaining screw and is compressed between a shoulder 52 thereon and a washer 54 which bears downwardly against the inner side of the bottom closure plate, thus coupling the retaining rod in the canister and maintaining it in place even when the canister is removed from the absorber housing.

The construction and function of the down tube is substantially the same as described in my abovementioned copending application. Thus, at its lower end, the down tube 30 carries a conical, substantially rigid, perforated screen 56 which is adapted to support a bed of a carbon dioxide absorbent material, such as soda lime, in the chamber 58 formed between the outer shell of the canister and the down tube 32. The screen 56 has at its lower end a supporting flange 60 which is so constructed as to have a vertical flange portion 62 and a radially extending rib portion 64. The down tube assembly and the charge bed carried thereon are thus substantially carried by the flange 60. It will be seen that there is formed between the conical screen 56 and conical bottom plate 38 a chamber 66 into which the gases delivered from the down tube 32 are conducted and from whence they pass radially outwardly and upwardly through the perforated screen and the charge bed supported thereon. Due to the differential inclination of the conical members 56 and 58, the chamber 66 has a gradually diminishing cross-sectional flow area in an outward direction to assist in the manifolding and distribution of the gases across the charge bed. In addition, it will be seen that the effective path of the gases in the outer strata of the bed become increasingly greater and are maximum at the outer boundary adjacent the canister shell 26. This construction as previously described in my copending application effectively improves and equalizes the distribution of the gas flow across the area of the charge bed and minimizes the concentration of gas flow along the side wall of the canister by warrant of the greater length of this path.

The shell 26 of the canister comprises a transparent non-conductive material through which it is possible to view the charge material therein. Thus, as previously mentioned, it is possible by observing the color, or other indicator characteristics of the charge material, to determine the condition of the absorbent and adjudge when it is necessary to replace the charge. The shell carries at its lower end a gasket 68 which, it will be seen, is illustrated separately in Fig. 5. In reference to this drawing, it will be seen that the gasket 68 comprises an annular member of compressible gasket material having a vertical slot 70 extending downwardly from its upper side. As may be seen in Fig. 5, the gasket is preformed to provide a lip 74 projecting above the end of the slot 70 which is deflected upon insertion of the shell 26 thus creating therebetween a slight lateral compression which is effective to seal the joint and thus occlude charge particles or gases from entering therein. Similarly, a preformed lip 76 is formed at the lower end of the gasket which, when disposed against the bottom closure plate 38, forms a similar engagement therewith. Referring again to Fig. 3, it will be seen that the bottom plate 38 has an upturned outer rim 78 within which the gasket 68 is seated. The bottom plate and canister shell are interconnected by the fastening means best seen in Fig. 4, including a series of circumferentially spaced, radially projecting screws 80 which are threaded into suitable threaded openings proximate to the bottom end of the shell. Each of the screws 80 carries a cylindrical bushing 82 on its shank and is threaded into the shell so that the bushing is firmly gripped between the head end of the screw and the outer wall of the shell 26. The screws and bushings form radially extending lugs which extend through openings 24 in the outer flange 78 of the bottom plate and thereby form a supporting interconnection. It will be seen that openings 86 are formed in the outer flap of the gasket member corresponding to the flange openings 84 for accommodation of the retaining screws 80. The bottom plate 38 is secured by pressing the plate inwardly against the bottom gasket, thus compressing and forming an initial seal between the bottom end of the shell and the bottom plate. When so compressed, the openings 84 and 86 are in registry with the threaded openings in the lower end of the shell 26 so that the screws 80 with the bushings 82 may be inserted therein. It will be seen that the bottom plate is retained by the engagement of the upper sides of the openings 84 against the bushings 82. This construction affords an effective sealing connection between the bottom closure plate and the canister shell which is at the same time not of a necessarily permanent nature, but which may be easily disassembled so that replacement or repair of any of these members may be easily accomplished.

It will be noted that the inner lip 76 of the annular canister, bottom gasket is pre-stressed in engagement with the bottom closure plate 38 when the shell and bottom plate are assembled, regardless of whether the canister is mounted on the absorber housing. In the normal course of use considerable moisture may collect in the bottom of the canister and it is desirable to prevent this water from running out when the canister is disconnected from the absorber for recharging. Such pre-stressing of the gasket guarantees a seal even though the retaining rod is disengaged from the absorber housing.

It will be understood that the above construction is highly expedient in view of the nature and composition of the canister shell member 26. The above construction, it will be seen, permits simple and effective means of removably connecting the bottom plate of the canister therewith, but which is of an effective gas-tight form.

Referring again to Fig. 3, it will be seen that the canister shell is surrounded by a cylindrical cage or screen 90 extending over the entire exposed length of the transparent canister shell.

Figure 5:
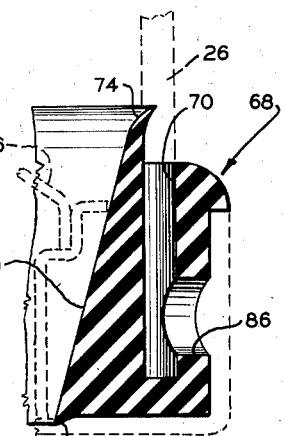
Fig. 5 is a partial sectional view illustrating the gasket element interposed between the bottom plate and the cylindrical portion of the canister illustrating its form and shape prior to assembly.

Referring now to Fig. 5, it will be seen that the screen 90 comprises a series of vertically spaced, horizontal metallic coils or rings 92 joined together by a series of circumferentially spaced, longitudinally extending ribs 94. The vertical ribs or strips 94 are bent inwardly as shown at 96 at their upper ends so that these portions bear frictionally against the upper outer edge of the canister shell as may be seen in Fig. 3. The protective cage is interconnected with the canister by means of three U-shaped straps 98 extending below the lower edge of the cage and which extend over the retaining screws 80 as illustrated in Fig. 5. The straps 98 are arranged so as to be flexible and capable of movement in an outward direction in order to enable them to be slipped over the ends of the retaining screws 80 when the cage is placed over the canister. This, it will be seen, is accomplished by removing the canister from the absorber housing and placing the cage over the canister shell from the top. The flexible attachment of the retaining straps may be provided as shown in Fig. 5 by soldering or welding the upper end of the straps to two successive horizontal rings 92' and thence extending the lower portion of the strap downwardly, preferably so that the lower end is inclined inwardly slightly so that the diametric spacing between the circumferentially arranged straps is normally slightly less than the diameter of the outer vertical flange of the bottom plate 38. Thus the strap is permitted a suitable degree of flexibility and, when placed on the canister as shown, the lower ends of the straps will be pressed outwardly from their normal position by the flange portion of the bottom closure and will, thereby, have a positive frictional bearing pressure against the bottom of the closure plate. As a result, the cage is thereby positively linked with the retaining screw element 80 and is insured of a continuous conductive linkage between the cage and the metallic bottom closure of the canister. The positive linkage, it will be seen, affords insurance against inadvertent dropping of the canister when it is removed from the absorber housing, inasmuch as the canister would, in this event, normally be held by the hands of the operator gripping the cage. By the engagement of the straps with the retaining screws, the canister in effect is supported within the cage and prevented from slipping out of it when the cage is held.

The continuous electrical conductivity provided by the cage is, of course, extremely important in connection with the canister and absorber apparatus. Thus, it is extremely undesirable in apparatus of this type to permit any portion of the apparatus to be electrically insulated from the surrounding portions of the equipment and it is highly desirable to insure that the entire piece of equipment is safely grounded. This prevents the undesirable and hazardous accumulation of static charges or any such electrically insulated element of the apparatus, which, in the event of the discharge of any such accumulated static potential, may cause ignition of the combustible gases used therein. It will be seen that in the apparatus as above described the screen, by its metal-to-metal contact with the bottom closure plate, is electrically connected in turn to the absorber housing through the retaining rod 40 which bears through the spring and washers at its lower end against the closure plate as seen in Fig. 3 and is threadedly received in the bushing mounting at the upper end of the absorber housing. As illustrated in Fig. 1, the absorber housing in turn is connected by suitable metallic bracket means 13 to a conventional type of anesthetic machine. In accordance with the usual safe practices in operating rooms and the like, such machines are provided with suitable electrical connecting means for grounding and thus eliminating the possibility of a build-up of hazardous electrical charges therein.

The protective cage 90 as may be seen in Fig. 3 completely surrounds and shields the nonconductive transparent canister shell 26. The ring members 92 and the vertical ribs 94 making up the cage are so spaced and arranged that any frictional contact against the shell itself during the normal usage of the absorber is substantially impossible. It will be understood, of course, that if such frictional contact were possible, for example, by the operator's brushing his arm against the shell, electrostatic charges might be created and imparted to the canister shell. Such an eventuality is avoided by the provision of the protective cage. It will be understood, of course, that in the particular form of the cage herein shown it would be possible, if one sought deliberately to rub against the canister and thus produce an undesirable electrostatic charge thereon, that this would be possible. However, in the absence of any such deliberate intent, the arrangement as substantially shown is effective for the intended purpose. If it were desired, of course, it is entirely possible to provide a screen in which the interstices through which access might be had to the canister shell are sufficiently small to prevent this while, at the same time, permitting a desired degree of visibility of the charge through the canister.

It will be noted upon reference to Fig. 3 that an additional structural feature of the bottom gasket member 68 is in the provision of a wedge-shape cross-section therein on the inner side of the canister shell providing an inclined inner surface portion designated at 100. It will be seen that this inclined portion of the gasket makes it possible for the radially extending rib portion 64 of the flange, attached to the lower end of the perforated screen element 56, to provide an engagement with the gasket, thus affording an effective seal between the upper charge chamber 58 and the bottom manifold chamber 66. This is effective to prevent the accession of the particles of absorbent material to the bottom of the canister where, in time, they may become caked and cause difficulty in cleansing and otherwise maintaining the canister in suitable operating condition.

It is to be understood that the invention may be used in other ways and that embodiments thereof other than the preferred embodiment herein-above described may be employed without departing from the scope of the invention as defined in the following claims.

I claim:

1. An absorber device for removing carbon dioxide from anesthetic respiratory gases comprising an absorber housing having a gas inlet and a gas outlet adapted, respectively, to be connected to exhalation and inhalation gas conduit means of an anesthetic breathing circuit so as to permit the circulation through said housing of anesthetic respiratory gases, separate gas passages in said housing connecting respectively with said inlet and outlet, a canister, adapted to hold a charge of carbon dioxide absorbent material, detachably supported on said absorber housing, said canister having a delivery and a discharge opening arranged to connect, respectively, with said separate gas passages and to conduct anesthetic respiratory gases delivered to said absorber housing longitudinally through said canister in contact with the charge of said absorbent material therein, said canister having a longitudinally extending shell within which said absorbent charge is confined including a longitudinally extending wall portion of substantially electrically nonconductive material through which the abutting charge of said absorbent material is visible externally of said canister, a metallic perforated member provided with a multiplicity of relatively small-size openings disposed externally in confronting relation to said transparent canister wall portion and substantially coextensive therewith so as to effectively shield said transparent portion from normal external contact without substantially interfering with the visibility of said absorbent charge therethrough and means forming an electrically conductive connection between said perforated member and said absorber housing.

2. A carbon dioxide absorber comprising a housing through which anesthetic gases containing carbon dioxide are circulated, means forming separate gas ports in said housing through which said gases may be conducted respectively to and from said housing, a canister adapted to hold a supply of carbon dioxide absorbent material, detachably mounted on said housing and having means registering with said gas ports to cause passage of said gases through said canister in contact with the absorbent charge therein, said canister having a substantially cylindrical, transparent shell portion of substantially non-conductive material within which said charge is held and a metallic cover forming a closure for one end of said shell, a metallic retaining rod extending from said closure through said shell, releasably engaging with said housing to secure said canister to said housing, and a perforate, protective, metallic cage substantially completely surrounding said shell and engaging and forming an electrical linkage with said bottom closure member.

3. A carbon dioxide absorber according to claim 2 wherein said gas ports are formed in a bottom face of said housing, said canister shell is open at one end and is received thereat against the bottom of said absorber housing such that said canister completely receives said gas ports and a longitudinal conduit is disposed within said canister in registry at one end with one of said gas ports and communicating with a distributing chamber at the bottom of said canister such that said gases are conducted longitudinally through the charge placed in said canister.

4. A carbon dioxide absorber according to claim 3 wherein said metallic bottom closure member has a longitudinally extending flange portion overlapping the lower end of said canister shell and said flange portion and canister shell are detachably connected by locking means.

5. A carbon dioxide absorber according to claim 4 wherein said flange portion is a cylindrical flange in substantially concentric relation to said shell, and wherein a compressible gasket member is interposed between said canister shell and said bottom closure, and held under compression therebetween by said locking means.

6. A carbon dioxide absorber according to claim 5 wherein said canister shell and said flange portion are provided with a plurality of sets of corresponding openings adapted to be placed in registry respectively when said gasket is compressed a predetermined amount and said locking means extend radially through said registered openings and effectively maintain said canister and bottom closure in such relative positions wherein said openings are substantially in registry.

7. A carbon dioxide absorber according to claim 6 wherein said gasket comprises an annular member having a slot in which the bottom edge of said canister shell is received, said openings in said canister shell are circumferentially spaced threaded openings in the end portion of said shell received in said gasket, said gasket has corresponding openings in the outer portion thereof registering with said threaded openings, said flange portion comprises an outer upturned rim of said bottom closure extending around the lower gasket receiving end of said canister shell, and said locking means comprise pins threadedly received in said threaded canister shell openings and extending radially through and engaging with the walls of said corresponding flange openings of said bottom closure flange to thereby hold said separable members together against the longitudinally opposing forces produced by said compressed gasket.

8. A carbon dioxide absorber according to claim 7 wherein said protective cage comprises a wire cage having a series of closely spaced rings surrounding said canister shell joined by longitudinally extending members and having a plurality of circumferentially spaced, radially displaceable, resilient elements extending longitudinally at the lower end thereof, normally bearing inwardly against said radial flange, said radial locking pins project outwardly beyond said bottom closure flange, and said resilient elements form a releasable engagement therewith preventing opposite longitudinal displacement of said canister and said cage.

9. An absorber device for separating the carbon dioxide content from respiratory gas mixtures comprising a housing having first and second openings in a bottom wall thereof, an open-topped cylindrical canister, having substantially transparent, electrically-nonconductive side walls, detachably received in a substantially gas-tight connection with the said bottom wall of said absorber housing so as to encompass within the open top of said canister said first and second openings, securing means including a bearing member engageable with the bottom of said canister extending upwardly through said canister, detachably engageable with said absorber housing to secure said canister thereagainst, a divider unit removably held within said canister including a vertically extending tubular member effective at its upper end to register with said first opening in said absorber housing and terminating at its lower end in an outwardly extending screen member forming a gas conductive partition dividing said canister into a gas collection space below said screen member into which the lower end of said tube opens, and an upper chamber above said screen adapted to receive a charge bed of absorbent material to be supported on said screen, such that gases circulated through said absorber housing may be conducted through the vertical depth of the charge bed, and a cylindrical, metallic, perforated member surrounding said canister, extending at least over the length of said transparent wall portion thereof, means forming an electrically conductive connection between said perforated member and said absorber housing, said canister comprising a cylindrical plastic shell having a separable metal end cap at the bottom thereof, said cylindrical metallic perforated member including means forming a metallic contact with said end cap of said canister and said securing means for said canister including a vertically extending metallic rod interconnecting the bottom cap of said canister and said absorber housing.

References Cited in the file of this patent

UNITED STATES PATENTS

| 1,725,893 | Yablick | Aug. 27, 1929 |
| 2,614,561 | Fox | Oct. 21, 1952 |
| 2,675,885 | Fox | Apr. 20, 1954 |

OTHER REFERENCES

Jour. A.M.A., August 26, 1939, Static Spark Woodbridge et al. pp. 740–744.